April 16, 1968  R. W. ROBERTS  3,378,393
EVAPORATIVE APPLICATION OF METAL COATINGS TO DIAMOND
Filed Nov. 19, 1964
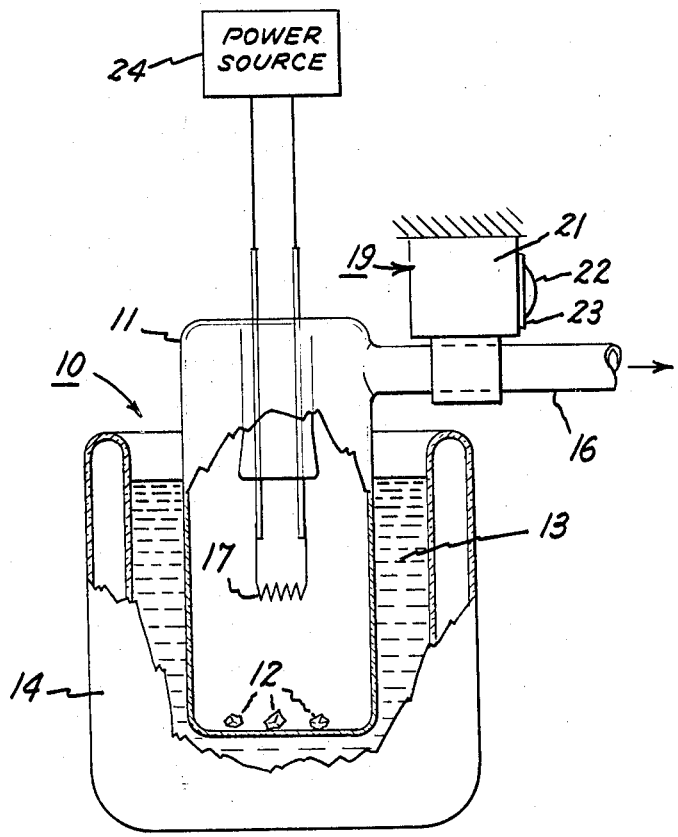
Inventor:
Richard W. Roberts,
by Leo J. MaLossi
His Attorney.

United States Patent Office 3,378,393
Patented Apr. 16, 1968

3,378,393
EVAPORATIVE APPLICATION OF METAL COATINGS TO DIAMOND
Richard W. Roberts, Schenectady, N.Y., assignor to General Electric Company, a corporation of New York
Filed Nov. 19, 1964, Ser. No. 412,556
1 Claim. (Cl. 117—100)

ABSTRACT OF THE DISCLOSURE

This application describes the evaporative deposition of a firmly bonded metal film over diamond surfaces while simultaneously lowering the temperature of the diamond material to quickly conduct away heat reaching the diamond during the deposition process. The cooling medium employed in the description of the invention is liquid nitrogen, which has a temperature of $-196°$ C., but other cooling mediums may be employed as long as the criterion of providing a temperature below about $-78°$ C. is adhered to.

---

This invention relates to the application of metal coatings to diamond surfaces and more particularly to a method and apparatus for improving to a substantial degree the bond between a diamond surface and a metal film deposited thereon by evaporation techniques.

Much effort has been expended in the past seeking a truly successful method for producing a metal-to-diamond bond predominantly for the purpose of affixing small sized diamonds in abrasive and cutting tools. Also, it has been contemplated that very small size diamond particles may be bonded together in a cluster to form an aggregate commonly referred to as a diamond compact. Such a compact contains diamond particles disposed at random and as a result any cleavage of the compact cannot occur along a single cleavage plane as would be the case with a single diamond crystal of equal size, but must follow a tortuous course dictated by the cleavage directions of the individual randomly disposed particles. Thus, in addition to promoting the use of very small diamond particles, which otherwise have very limited use, the resulting product should provide superior performance as an abrasive tool element.

In the absence of some technique by which these diamond crystals may be bonded together in self-bonded relationship, it becomes necessary to provide some bonding medium disposed between the crystals and as a result attempts have been made to coat the small diamond particles with some metal film and then to join the metal-coated diamonds by brazing with a second metal or alloy.

Testing of the strength of bond between diamond and various metal films deposited thereon by ordinary evaporation techniques has shown that such bonds, which were previously believed to be very strong, break at the bond rather than fracturing the diamond. In many instances, it was found that the metal films replicated the diamond surface very accurately and intimately but, however, remaining closely adhered to the diamond only so long as the layer completely enclosed the crystal. Once the layer was broken through at some point it was found that the metal film was easily separated from the diamond surface. Manifestly such coatings cannot be relied upon either to produce successful abrasive and cutting tools or to produce useable diamond compacts.

Since the evaporation process of applying metal coatings is relatively inexpensive, it is a prime object of this invention to provide a method by which metal films may be successfully evaporated on a substrate having a high rate of heat transfer in a manner providing a very strong bond between coating and substrate.

In addition, it is an object of this invention to provide apparatus for evaporating strongly adherent metal films upon a substrate having a high rate of heat transfer, which films are more uniform in thickness than heretofore.

In brief, this invention proposes to reduce the incidence of graphitization on the surface of the diamond induced during the ordinary evaporation process because of radiation heating from the filament of metal being evaporated to avoid the presence of a bond-preventing layer of graphite between the deposited metal film and the diamond surface. Because of the excellent thermal conductivity of diamond, it has been found that much of the heat reaching the surface of the diamond during the evaporation deposition can be withdrawn at such a very rapid rate from the diamond crystal that conversion of the diamond form of carbon to the graphite form is substantially prevented. At the same time this lowering of temperature of the diamond material simultaneously reduces the mobility of the impinging metal atoms on the surface thereof such that metal atoms reaching the surface of the diamond remain at or very close to the point of impact and, therefore, produce a more uniform evaporated film of metal. The mechanism for withdrawing heat from the diamond material is achieved by placing the evaporation tube together with the diamonds resting on the lower wall thereof in a very cold environment, such as in a bath of liquid nitrogen ($-196°$ C.). Thus, the rate at which heat is removed and the ultimate temperature of the diamonds during metal deposition is controlled with the particular cooling medium chosen.

Obviously modifications and variations of this invention are possible and will become apparent to those skilled in the art as additional disclosure of this invention is made in the following detailed description of an operative embodiment of apparatus employed in the practice of this invention as illustrated in the accompanying drawing.

The apparatus 10 employed in the practice of this invention comprises an evaporation tube 11 containing diamond crystals 12 suspended in a very cold medium 13 such as liquid nitrogen, capable of reducing the temperature of the base of tube 11 and, more important, of the diamond material 12 resting thereon substantially below a temperature of about $-78°$ C. The conventional Dewar flask 14, which is schematically illustrated, serves as the container for the cooling medium 13 wherein is suspended the evaporation tube 11 during the evaporation process. Any material such as crystals 12, to be coated with a metal film is introduced into tube 11 through neck 16, which also provides communication to a vacuum system (not shown) in order to reduce the pressure within evaporation tube 11 during operation to below about $10^{-6}$ torr (1 torr equals 1 mm. of mercury).

The metal filament 17 is heated to the requisite temperature to evaporate from the surface therefore atoms of the metal to be deposited on the particular substrate, such as crystals 12. Many metals have been evaporated as films on various substrates by the conventional evaporation technique and any of these metals may be employed in the practice of this invention. Examples of these metals include molybdenum, aluminum, tin and titanium, however, this list is not exhaustive.

In the case of coating crystals of material, such as diamonds, it is preferable to insure that all surfaces of the crystals be exposed to the depositing metal atoms and this may be accomplished by vibration of the tube 11 as by an electric vibrator device 19 attached to neck 16.

A simple vibrator construction comprises solenoid 21, movable core 22 and rubber bumper 23.

In the conduct of this invention very uniform films of molybdenum metal have been deposited upon and firmly adhered to the surface of diamond crystals. Torsion tests performed to indicate the strength of the diamond-metal bond have established that the bond produced between the molybdenum film and the diamond surface is stronger than the diamond, because the diamond, rather that the diamond-metal bond, fractured during the torsion test. The manner of the conduct of these tests is fully described in copending application Ser. No. 370,872, Vanderslice, now Patent No. 3,351,543, which application is assigned to the assignee of the instant application.

In preparing these coatings of diamond with molybdenum the diamond crystals were first rinsed in acetone, then in distilled water and dried prior to being introduced into evaporation tube 11. Thereafter, the evaporation tube 11 was connected to the vacuum system at neck 16 and the pressure within tube 11 was reduced to below about $10^{-6}$ torr. Thereafter, current was passed through metal filament 17 from power supply 24 evaporating molybdenum atoms therefrom until a film of molybdenum of about 600 Angstroms thickness was deposited on the diamond crystals. In order to insure coating of the entire surface of each diamond crystal the evaporation tube 11 was caused to vibrate by vibrator unit 19.

Although the operation of this invention has been described predominantly in connection with the coating of diamond crystals, which pose a particularly difficult coating problem, this invention is not so limited in its application. Thus, whenever it is desired to deposit a highly adherent metallic coat over a substrate having a high coefficient of thermal conductivity (above about 0.5 calories/cm. sec. °C. at the operating temperature) and being of a substance subject to surface damage by the heat radiating from filament 17 during the evaporation process, this invention is particularly advantageous.

Diamond is a particularly advantageous material for the application of this invention, because not only is its coefficient of thermal conductivity high at room temperature ($\lambda \sim 0.9$ calories/cm. sec. °C.) but as the temperature decreases, the thermal conductivity increases such that at 180° K. diamond has a coefficient of thermal conductivity of about 4.5 calories/cm. sec. °C.

Various modifications are contemplated and may obviously be resorted to by those skilled in the art without departing from the spirit and scope of the invention, as hereinafter defined by the appended claims as only a single operative embodiment thereof has been disclosed.

What I claim as new and desire to secure by Letters Patent of the United States is:

1. A method for applying a very adherent coating of a metal to a diamond substrate comprising the steps of:
   (a) placing the diamond crystals to be coated in an exposed location in an evacuated container,
      (1) said diamond crystals being in heat exchange relationship with a cooling medium at a temperature below about −78° C.,
   (b) heating a quantity of a coating metal within said container to evaporate atoms of said metal therein whereby a coating of some desired thickness is applied to the surfaces of the diamond crystals, and
   (c) simultaneously withdrawing heat from said substrate at a rate determined by the temperature of the cooling medium.

References Cited
UNITED STATES PATENTS

| | | |
|---|---|---|
| 2,074,281 | 3/1937 | Sommer. |
| 2,382,666 | 8/1945 | Rohrig et al. |
| 2,411,867 | 12/1946 | Brenner. |
| 2,872,342 | 2/1959 | Mack. |
| 3,113,889 | 12/1963 | Cooper et al. |

RALPH S. KENDALL, *Primary Examiner.*

ALFRED L. LEAVITT, *Examiner.*

A. GOLIAN, *Assistant Examiner.*